UNITED STATES PATENT OFFICE.

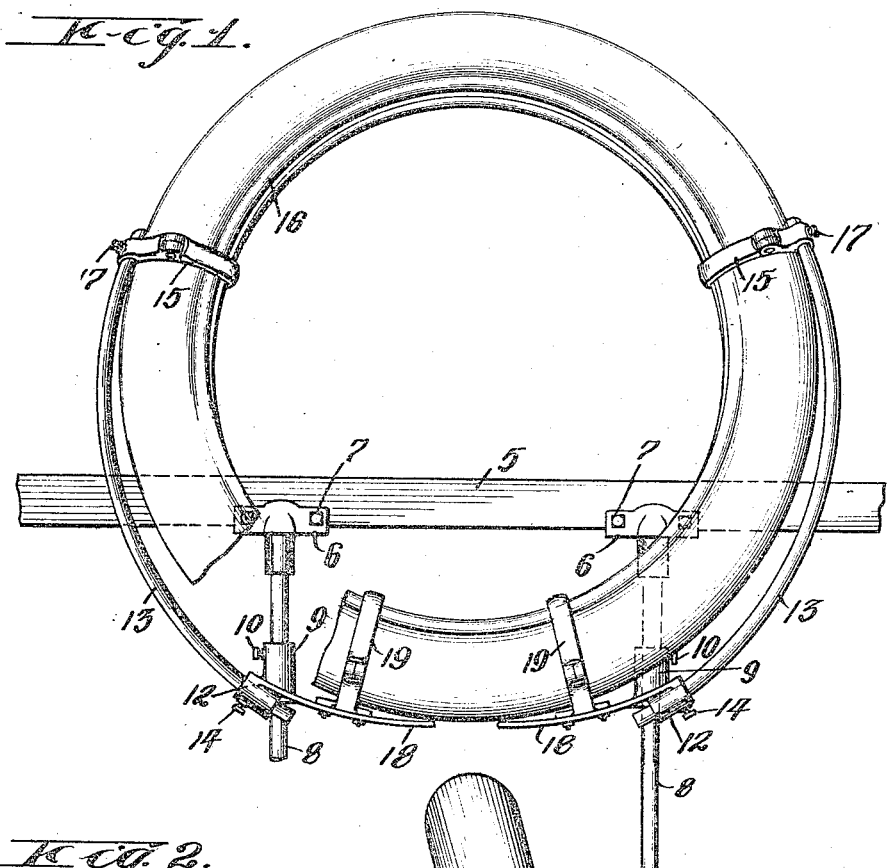
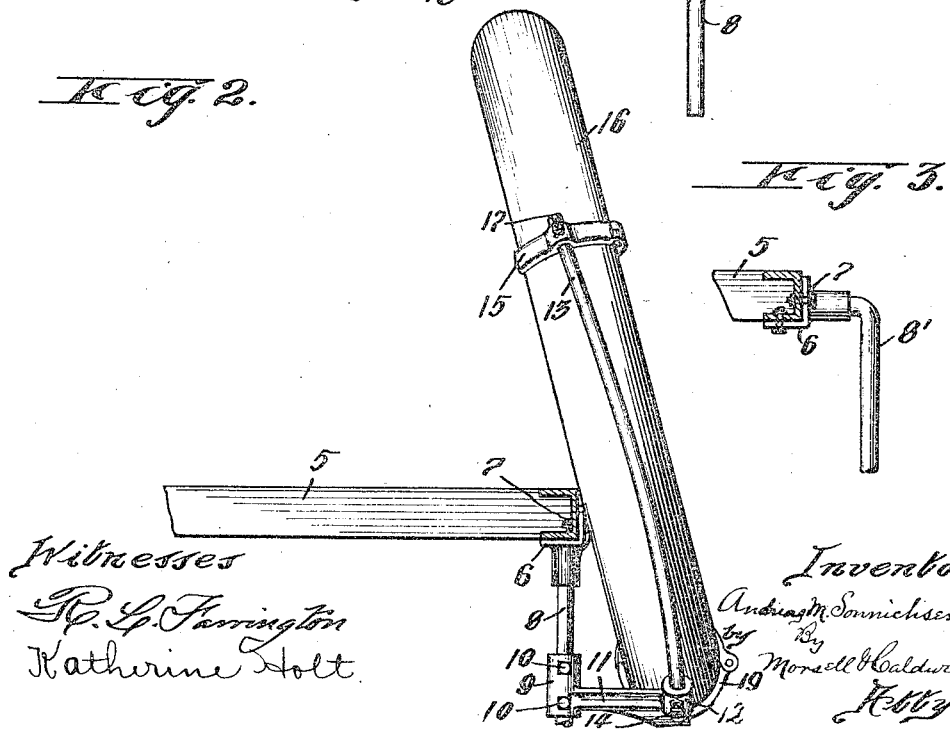

ANDREAS M. SONNICHSEN, OF MILWAUKEE, WISCONSIN, ASSIGNOR TO AUTO PARTS MANUFACTURING COMPANY, OF MILWAUKEE, WISCONSIN, A CORPORATION OF WISCONSIN.

TIRE-HOLDER.

1,036,020.  Specification of Letters Patent.  Patented Aug. 20, 1912.

Application filed August 31, 1911. Serial No. 646,963.

*To all whom it may concern:*

Be it known that I, ANDREAS M. SONNICHSEN, a citizen of the United States, and resident of Milwaukee, in the county of Milwaukee and State of Wisconsin, have invented new and useful Improvements in Tire-Holders, of which the following is a description, reference being had to the accompanying drawings, which are a part of this specification.

This invention relates to improvements in tire holders for holding extra automobile tires and more particularly to tire holders which are adapted to be secured to the rear frame portion of an automobile.

It is one of the objects of this invention to provide a tire holder which is simple in construction and is inexpensive to manufacture and which may be easily attached to the rear portion of the frames of automobiles of various makes.

A further object of the invention is to provide a tire holder to which tires of various sizes may be easily attached and detached and when attached are securely held in place against accidental detachment.

A further object of the invention is to provide a tire holder which may be easily adjusted to hold tires at different angles.

With the above, and other objects in view, the invention consists of the tire holder and its parts and combinations as set forth in the claims, and all equivalents thereof.

In the accompanying drawing in which the same reference characters indicate the same parts in all of the views; Figure 1 is a side view of the improved holder, shown attached to the rear portion of an automobile frame and an automobile tire positioned therein, a part of the tire being broken away to show parts of the holder in the rear thereof; Fig. 2 is an edge view of the holder and a sectional view of the frame, a tire also being shown in position in the holder; and Fig. 3 is a detail view of a modified form of frame attaching means.

Referring to the drawing the numeral 5 indicates the rear portion of an automobile frame of ordinary construction and 6 the angled members which are adapted to be bolted thereto by bolts 7. The rear frames of automobiles are usually formed of channel iron, with the open side of the channel facing the front portion of the automobile, and the two part tire holders are particularly adapted to be bolted to the rear and bottom portion of this channel iron. The angled members are provided with depending tubular bosses and rods 8 inserted in the bosses, and depending downwardly therefrom, serve to hold the other portions of the holder vertically adjustable thereto. Tubular brackets 9 mounted on the rods 8 and vertically adjustably connected to the rods by bolts 10, are provided with horizontally projecting arms 11 which have angularly extending tubular portions 12 formed on their outer ends. Arc-shaped rods 13 extending through the tubular portions 12 and adjustably fastened thereto by bolts 14, are provided with tire encircling members 15 on their upper portions. These members 15 may be of any desired form to securely fasten the upper portions of a tire 16 to the arc-shaped rods. The encircling members are adjustably secured to the rods by bolts 17. The angularly extending tubular portions of the arms are provided with downwardly curved extensions 18 which project toward each other and are curved approximately concentric with relation to the arc of the rods 13. These extensions are provided with tire encircling members 19 similar to the members 15, with the exception that the members 19 are permanently connected to the extensions by bolts.

In the modified form shown in Fig. 3, the depending rods 8' are bent at right angles and the angled members 6 are fastened to the automobile frame so that their tubular bosses will extend horizontally therefrom to accommodate the bent portions of the depending rods. This modified construction provides for projecting the tire holder at a distance rearwardly of the frame in order to avoid mufflers or other devices connected to the frame at this point.

In use, the two parts of the holder are spaced a proper distance apart to accommodate the tire it is desired to hold and are bolted to the frame. The tubular members are now adjusted vertically on the depending rods to the desired height and fastened by their bolts. The arc-shaped rods are now turned and fastened in the angularly extending tubular portions to incline the said rods in the direction it is desired to have the tire incline, and the tire is then fastened in the encircling tire members.

From the foregoing description it will be seen that the holder provides for raising or lowering the tire vertically and for holding the tire in a vertical position or inclining it forwardly or rearwardly by turning the arc-shaped rods. The construction also provides for positioning the tire rearwardly from the frame to avoid other devices connected thereto.

What I claim as my invention is:

1. A tire holder, comprising depending members provided with means for attaching to a supporting frame, tubular brackets mounted on the depending members, said brackets provided with extending tubular portions, and arc-shaped members extending through the tubular portions and revolubly adjustable therein and also extending above the depending members to provide for holding a tire at an angle with relation to the depending members.

2. A tire holder, comprising depending members provided with means for attaching to a supporting frame, tubular brackets adjustably mounted on the depending members, said brackets provided with horizontally projecting arms having tubular portions, and arc-shaped members extending through the tubular portions and revolubly adjustable therein and also extending above the depending members to provide for holding a tire at an angle with relation to the depending members.

3. A tire holder, comprising depending members provided with means for attaching to a supporting frame, tubular brackets adjustably mounted on the depending members, said brackets provided with horizontally projecting arms having tubular portions, said brackets also provided with curved extensions having tire engaging means, and arc-shaped members extending through the tubular portions and revolubly adjustable therein and also extending above the depending members to provide for holding a tire at an angle with relation to the depending members.

4. A tire holder, comprising independent depending members provided with means for attaching to a supporting frame, tubular brackets adjustably mounted on the depending members, said brackets provided with horizontally projecting arms having tubular portions, said brackets also provided with curved extensions having tire engaging means, arc-shaped rods extending through the tubular portions and revolubly adjustable therein and also extending above the depending members to provide for holding a tire at an angle with relation to the depending members, and tire engaging means carried by the upper portions of said rods.

5. A tire holder, comprising independent angled members provided with depending rods, tubular brackets adjustably mounted on the depending rods, said brackets provided with horizontally projecting arms having angularly extending tubular portions, said brackets also provided with curved extensions having tire engaging means, arc-shaped rods adjustably extending through the tubular portions and also revolubly adjustable therein to provide for holding a tire at an angle with relation to the depending rods said rods also extending to positions above the angled members, and tire engaging means adjustably carried by the upper portions of said arc-shaped rods.

6. A tire holder, comprising angled members provided with depending angled rods, tubular brackets adjustably mounted on the depending rods, said brackets provided with horizontally projecting arms having angularly extending tubular portions, said brackets also provided with curved extensions having tire engaging means, arc-shaped rods adjustably extending through the tubular portions and also revolubly adjustable therein to provide for holding a tire at an angle with relation to the depending rods, and tire engaging means adjustably carried by the upper portions of said arc-shaped rods.

7. A tire holder, comprising a pair of angled members provided with depending rods, tubular brackets adjustably mounted on the depending rods, said brackets provided with horizontally projecting arms having angularly extending tubular portions and also having curved extensions which project toward each other, said extensions provided with tire engaging means, arc-shaped rods longitudinally adjustably extending through the tubular portions of the brackets and also revolubly adjustable therein to provide for holding a tire at different angles with relation to the depending rods, and tire engaging means adjustably carried by the upper portions of the arc-shaped rods, said angled members adapted to be fastened to a support at greater or less distances apart to accommodate tires of different diameters.

8. A tire holder, comprising independent depending members provided with means for attaching to a supporting frame, brackets mounted on the depending members at points below the support attaching means of said members, and arc shaped members connected to the brackets and extending to positions above the support attaching means to hold a tire at an angle with relation to the depending members and with the tire extending partly above the said support attaching means, said depending members adapted to be fastened to a support at greater or less distances apart to accommodate tires of different diameters.

In testimony whereof, I affix my signature, in presence of two witnesses.

ANDREAS M. SONNICHSEN.

Witnesses:
R. S. C. CALDWELL,
GOLDIE LEVINE.